Jan. 12, 1954    L. I. DE WITT    2,665,872
MIXING BOWL HOLDER
Filed March 3, 1952
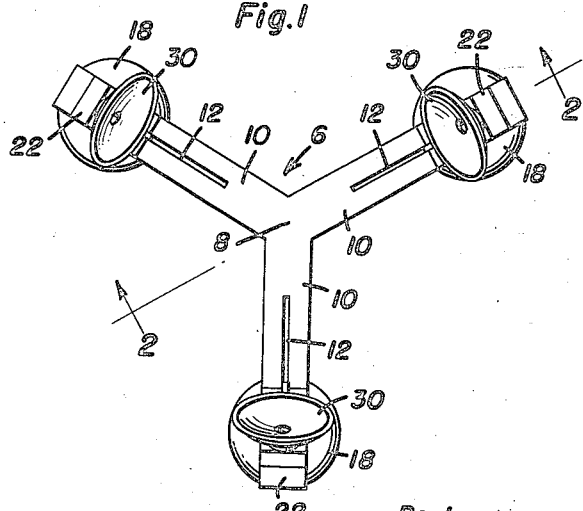
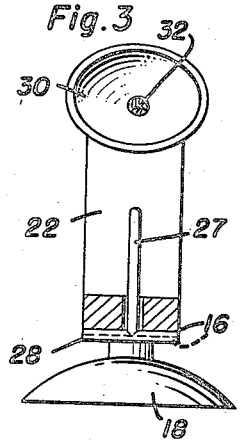
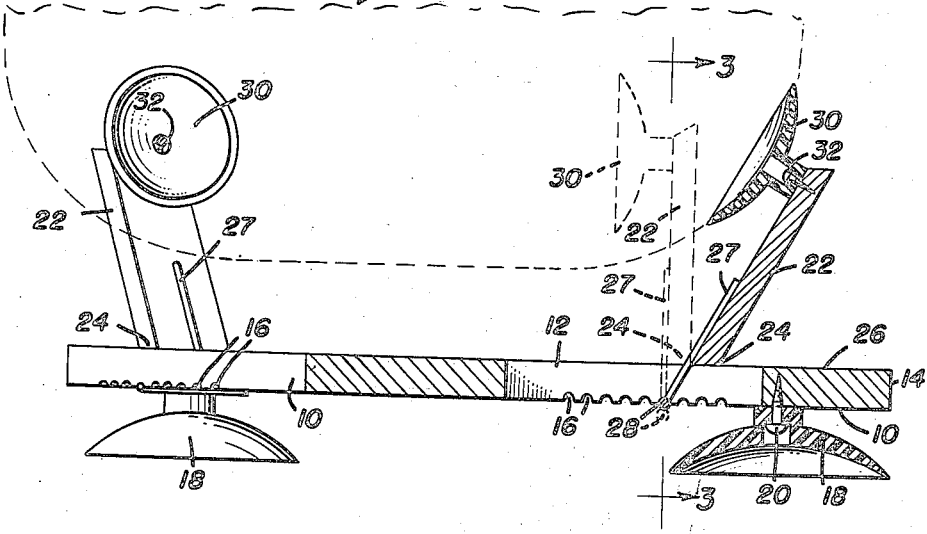
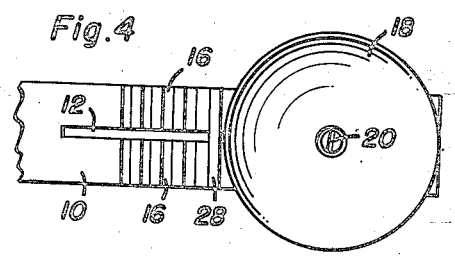
Louis I. DeWitt
INVENTOR.
BY
*Attorneys*

Patented Jan. 12, 1954

2,665,872

UNITED STATES PATENT OFFICE 2,665,872

MIXING BOWL HOLDER

Louis I. De Witt, Bakersfield, Calif.

Application March 3, 1952, Serial No. 274,569

2 Claims. (Cl. 248—362)

The present invention relates to a novelly constructed highly useful device whose purpose is to hold a mixing bowl firmly at a place of anchorage on a kitchen table or the like, during a mixing accomplishment, whereby to, in this manner, free the housewife of having to hold the bowl with one hand while mixing batter or the like and introducing special ingredients of one kind or another.

It is a matter of common knowledge to those who do kitchen chores and handle cooking requirements that, ordinarily, one hand is required to hold the bowl, making it necessary to set the bowl down when additional ingredients are to be added. It is the obvious object of the instant invention to provide a simple and practical contrivance whereby once the bowl is set in position it will stay put so as to permit one hand to be used for mixing and the other hand left free for charging the primary mixture with extra required ingredients.

Another object of the invention is to provide a satisfactory structural adaptation and, in so doing, to improve upon and reduce the number of parts entering into the combination, thereby not only increasing the structure as a whole, but also rendering the same less costly to manufacture and to otherwise simplify factors of assembling and sale.

A further object of the invention is to provide a construction which is characterized by a base with attaching means and a plurality of bowl embracing arms, the arms being radially adjustable on the base and the upper ends of said arms being provided with gripping members, for instance rubber suction cups, whereby to conveniently anchor and hold the mixing bowl.

More specifically, novelty is predicated on a simple wooden or equivalent base characterized by radial arms, said arms being held on a table or other support by rubber suction cups, and upstanding complemental arms having their respective lower ends slidably and adjustably connected to the radial arms and being provided at their upper ends with rubber suction cups to take hold of and retain the bowl.

Then, too, novelty is predicated on the use of slotted arms in the base having keeper notches or seats on their lower sides, the upright bowl embracing arms having T-shaped brackets whose stem portions slide back and forth in their respective slots and whose head portions are releasably engageable with the keeper notches.

Other objects, features and advantages will become more readily apparent from the following description and the accompanying sheet of illustrative drawings.

In the accompanying sheet of illustrative drawings, wherein like numerals are employed to designate like parts throughout the views:

Figure 1 is a top plan view of a mixing bowl support and holder constructed in accordance with the present invention;

Figure 2 is a section on the line 2—2 of Figure 1 looking in the direction of the arrows;

Figure 3 is a vertical section on the line 3—3 of Figure 2 looking in the direction of the arrows; and, Figure 4 is an enlarged fragmentary bottom plan view of one of the radial arms in the base means.

Referring now to the drawings and first with reference to Figure 1 the base means takes the form of a triple membered spider. Said base is denoted, as a unitary device by the numeral 6 and it may be constructed from wood, commercial plastics, aluminum or any other suitable light weight but durable material. The central or hub portion is denoted at 8 and the three circumferentially spaced equidistant horizontal arms are denoted by the numerals 10. All of these arms are the same in construction and the description of one will suffice for all. That is to say, each arm has a central longitudinal slot 12 which is best shown in Figure 2 and terminates inwardly of the outer end portion 14 of the arm. The undersurface of the arm on opposite sides of the slot is provided with transversely disposed properly arranged notches forming selectively usable keeper seats 16. The outer end portions of the arms 14 are provided with rubber hold-down members each of which is in the form of a simple rubber suction cup 18. The cup is secured in place as at 20 so that it may be replaced if necessary.

For each base arm there is an upright bowl embracing arm and the latter arms are denoted by the numerals 22.

The lower end portion of each arm 22 is beveled or mitered to assume the desired obliquety as shown at 24 and this end portion rests against the horizontal surface which may be described as the upper or top surface 26 of the arm 14. There is an inverted T-shaped bracket for each arm 22 and the shank or stem portion 27 is superimposed against and suitably secured to a coacting surface of the lower portion of the arm 22. The cross head 28 is selectively engageable in the keeper seats or notches 16 in an obvious manner. There is a rubber suction cup 30 on each embracing arm and this is secured removably in place as at 32. It will be evident, therefore, that the bracketed embracing arms 22 are adjustably and slidably mounted for radial regulation on the base means. To accomplish this all that is necessary, is to tilt the upper end portion of the arm 22 inwardly toward the center of the base as shown in dotted lines in Figure 2. This clears binding contact between the surfaces 24 and 26 and allows the cross head 28 to be momentarily freed so that the shank 27 may be slid back and forth in the slot. By engaging the suction cups on the upper ends of the arms 22 with the bowl and then making the correct adjustable connections between said arms and the base arms and making sure that the base is anchored on a surface on which it will hold, it will be evident that a satisfactory mixing bowl basing and holding device is thus had. The embracing and holding arms can be folded down onto the top of the legs when it is desired to put the bowl holder away in a cupboard. It can be taken apart easily for cleaning by tipping the arms toward the center and then turning them at right angles to the slot in the base arms. The cross head of the T-shaped bracket will then register with its slots and can be pulled upwardly through the slot in an obvious manner.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. In a structure of the class described, in combination, a base with at least one arm, a rubber suction cup attached to the underside portion of the outer end of said arm for temporarily attaching the same to a table or the like, said arm having a longitudinal centrally disposed slot and being provided on its under side with paired keeper notches, a bowl supporting arm having a mitered lower end engaged with the top of said one arm, a rubber suction cup attached to the upper end of said bowl holding arm, a T-shaped bracket having a stem portion superimposed or secured to said holding arm and also having a cross-head, said stem portion extending slidably through the slot and said cross-head being arranged to selectively engage in said notches.

2. Portable means whereby a mixing bowl may be temporarily supported without slipping on a table top or the like comprising, in combination, a base embodying a plurality of circumferentially spaced equidistant arms, rubber suction cups attached to the underside portions of the respective outer ends of said arms for temporarily attaching the same to said table top so that the base will not slide or rotate relative to the table top, each arm having a central longitudinally disposed slot and each arm being provided on its underside, on opposite sides of the slot, with transverse registering selectively usable keeper notches, a plurality of bowl embracing and supporting arms, one for each base arm, the lower end of said supporting arm being mitered and normally resting atop the base arm and slanting upwardly and outwardly in respect to the base arm, a T-shaped bracket having a stem portion secured to the lower end of said supporting arm, the stem portion extending through the slot and having a cross-head and the ends of the cross-head being hingedly, releasably and adjustably associated with said keeper notches, the weight of the bowl plus the weights of the respective supporting arms serving to hold the supporting arms in positions to which they are adjusted by hand, and means carried by the inner faces of the respective upper end portions of said supporting arms for temporarily engaging and holding the bowl on the base by way of said supporting arms.

LOUIS I. DE WITT.

References Cited in the file of this patent
UNITED STATES PATENTS

| Number | Name | Date |
|---|---|---|
| D. 148,736 | Travis | Feb. 17, 1948 |
| 565,539 | Hartzell | Aug. 11, 1896 |
| 1,056,669 | Harris | Mar. 18, 1913 |
| 1,744,669 | Ottmann | Jan. 21, 1930 |
| 1,771,682 | Landau | July 29, 1930 |
| 1,847,471 | Chafee | Mar. 1, 1932 |
| 2,056,078 | Slater | Sept. 29, 1936 |
| 2,089,714 | Schuler | Aug. 10, 1937 |